United States Patent
Dolphin et al.

(10) Patent No.: US 6,807,182 B1
(45) Date of Patent: Oct. 19, 2004

(54) STACKED NETWORK DEVICES INCLUDING A PROTOCOL ENGINE AND DISTRIBUTED TRUNK PORTS AND METHOD OF OPERATING SAME

(75) Inventors: Clive Dolphin, St Albans (GB); Graeme J McKerrell, Hemel Hempstead (GB); Paul J Moran, Hemel Hempstead (GB); Maurice Goodfellow, Dunstable (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/494,399

(22) Filed: Jan. 31, 2000

(30) Foreign Application Priority Data

Nov. 2, 1999 (GB) ............................................. 9925825

(51) Int. Cl.⁷ .......................... H04L 12/46; G06F 13/00
(52) U.S. Cl. ........................ 370/401; 370/463; 709/250
(58) Field of Search ................................ 370/389, 400, 370/401, 410, 419, 420, 463, 465; 709/238, 244, 249, 250

(56) References Cited

U.S. PATENT DOCUMENTS 5,610,905 A * 3/1997 Murthy et al. .............. 370/401
5,999,295 A * 12/1999 Vowell et al. ............... 359/152
6,104,696 A * 8/2000 Kadambi et al. ........... 370/218
6,108,702 A * 8/2000 Wood .......................... 709/224
6,175,868 B1 * 1/2001 Lavian et al. ............... 709/223

FOREIGN PATENT DOCUMENTS

GB          2333429 A       7/1999
WO          WO 99/29072     6/1999

* cited by examiner

*Primary Examiner*—Alpus H. Hsu
(74) *Attorney, Agent, or Firm*—Nixon & Vanderhye PC

(57) ABSTRACT

A trunk connection to a stack of network switches is coupled to physical ports distributed among the switches. A switch has an internal logical port for a protocol engine. A packet received by way of the trunk at a port on a switch which does not host the protocol engine is sent over a cascade connection to the host switch with a tag that is interpreted within the host switch as if the packet cam from the logical port. The tagging and interpretation distinguishes between packets which might or might not be intended for the protocol engine and did not arrive by way of the trunk from packets which are intended for the protocol engine and have been received by way of the trunk.

2 Claims, 5 Drawing Sheets

STACKED NETWORK DEVICES INCLUDING A PROTOCOL ENGINE AND DISTRIBUTED TRUNK PORTS AND METHOD OF OPERATING SAME

FIELD OF THE INVENTION

This invention relates generally to packet-based communication systems, such as 'Ethernet' systems, wherein data is conveyed by means of data packets that include address data and control or type data in addition to, in general, message data and cyclic redundancy code data.

The invention more particularly relates to network devices which can be stacked so as effectively to form a single logical unit and more particularly relates to a stack which can accommodate a trunk which has physical ports on a multiplicity of stacked units which include protocol engines.

BACKGROUND OF THE INVENTION

It is known to extend the performance or versatility of a network device, such as a switch, repeater or router for example by forming a stack of similar units. Each device normally is a multi-port device which can forward packets from or receive packets at any of the ports (which can typically both forward and receive packets) and it is known to connect such stack units by means of a cascade connection whereby for example a packet received at a port on one of the units in the stack can be directed to a port on another stack. Since units of this nature maintain a database which identify the remote devices which are connected to the respective ports, a packet received at a port on a particular unit and intended for a second remote device to which no port on that unit is connected can be tagged so that the packet is conveyed by way of a cascade connection to the other units including the one to which the second remote device is connected.

In general practice hitherto, each remote device to which a unit in a stack is connected is connected to a single one of the ports. However, in more recent practice the expedient of a trunked port has been developed. A trunked port is in essence a multi-path connection from a remote device to a multiplicity of ports. The advantage of a trunked port or trunk is that it can carry much more traffic than a single connection and accordingly it is useful where the data packet traffic from (or to) a particular device, such as a server, is likely to be very heavy, so that it would likely exceed the traffic carrying capacity of a single link to a single port on a switch or other device.

Where a trunk is connected to a multiplicity of physical ports on a single device or unit, it is known practice to employ, for forwarding packets to the trunk, a 'logical' or 'bridge' port and for the unit to direct all packets intended for forwarding over the trunk to that logical internal port. By means of hashing address data of the packet, the packets are distributed to the physical ports connected to the trunk. Packets received over the trunk will in any event be directed from the physical ports to the internal 'logical' or 'bridge' port.

Prior copending applications Ser. Nos. 09/201,368 and 09/201,345 to Jennings et al., filed 30 Nov. 1998, now issued as U.S. Pat. Nos. 6,463,479 and 6,425,015, respectively, describe the distribution of ports of a trunk over a plurality of units in a stack. It is necessary to be able to distinguish at a cascade port between packets that come via the cascade from another unit connected to a source which has a trunk connection to physical ports on both units and packets from a different source connected to merely another unit but which must arrive at the first unit by way of the cascade. This is solved according to the aforementioned applications by tagging packets (i.e. inserting a tag field) when they are transmitted by a cascade link to indicate whether the packet in question has arrived at the stack on a port which forms part of a trunk connection and, if so, which trunk. Such a field may be inserted immediately in front of a destination address field in a packet or at any other appropriate or convenient position within the data packet.

The present invention concerns the running of protocol engines on a unit which forms part of a stack and wherein there is a trunk connection to a multiplicity of physical ports on two or more of the units in the stack.

A protocol engine is an entity, normally modeled as a finite state machine, that takes in data formatted according to the protocol formatting rules and produces a deterministic output based on that incoming data, previous data inputs and the processing rules of the protocol. That output is then applied to the system outside the protocol engine. The output could be in the form of some protocol data that is to be transmitted or some command passed to the external system.

In traditional systems a protocol engine is run on each unit in the stack. Each protocol engine controls all of the ports on the unit it is running on. With a trunk port that has physical ports on multiple units this solution does not work. Firstly the internal inputs to the protocol engine come, in part, from the packets that are received for that port. With a distributed trunk these protocol packets would be received by the local protocol engines which would not have knowledge of the packets received by other protocol engines. Since a protocol engine uses current and previous inputs to determine its current output, receiving an incomplete set of inputs would prevent the protocol engine from functioning correctly.

Secondly, the output from the protocol engines must be applied coherently to the trunk port. That is to say that any output packets should not be sent multiple times. It is not sufficient for the state of the port to simply be the state set by the last protocol engine that affected the port. Additionally any state applied to the trunk port must be applied to all physical ports that are a member of that trunk port and not just to the physical ports on any particular unit.

Hitherto, protocol engines which have been run on distributed systems, that is to say a system of stacked units, have required the running of a respective protocol engine on each unit in the stack and to arrange for the protocol engines to communicate across the stack to maintain synchronization within the stack. This solution is satisfactory for port-based system in the absence of a trunk which has physical ports distributed over the units in the stack, because all the data that a protocol engine requires is available locally on the unit to which the trunk ports are connected.

If a trunk (or each trunk) is connected to physical ports on more than one unit in a stack, some of the information that a protocol engine working with a trunk needs is now held on a remote unit in the stack.

As the remote sender is entitled to send protocol data messages down any of the physical ports in the trunk there is no guarantee which physical port and therefore which unit will receive any protocol messages sent. Protocol messages sent to special addresses reserved for that protocol will not automatically be forwarded across the cascade in the way that normal data packet would be. This means that unsolicited protocol messages and replies that use special addresses could arrive at any unit in the stack.

To enable protocol engines to use distributed trunked ports some mechanism must be found to make the information for that trunk port available locally to the protocol engine. Since the protocol packets that are needed by the protocol engine can only be identified by looking at the destination MAC address, packet type, incoming port number, and, in some cases, by looking into the data contents of the packet, the normal MAC address based forwarding mechanism will not solve this problem.

If a trunk is connected to ports on a multiplicity of units then the trunk can potentially be controlled by a multiplicity of protocol engines. In the majority of cases a single protocol engine should be running on the trunk port.

SUMMARY OF THE INVENTION

The present invention is based on a scheme wherein the trunk is unified into a single logical port located somewhere in the stack from the point of view of all the protocol engines within the stack. Thus the protocol engines are all presented with a single extra port on one unit in the stack. Actions that are applied to the logical protocol port are replicated over all the physical ports in the trunk. The protocol engine that is controlling the trunk is on a unit, in the stack, that has a physical port in the trunk connected to it locally. The protocol engine can then use the local port to send any protocol messages to the far end.

Accordingly, protocol data from any of the physical ports anywhere in the stack is made to appear to have come from the logical protocol port by forwarding the protocol messages to the unit hosting the logical protocol port. The forwarding mechanism looks at the incoming port number, destination MAC address, the protocol type, and optionally the data within the packet and determines if the packet should be forwarded. If the packet should be forwarded it is sent across the cascade to the unit that has the protocol engine for the trunk port on the same VLAN and with the same trunk ID as the incoming packet. The forwarded packet is the same as the received packet except that it is sent to the unit hosting the protocol engine across the cascade.

DETAILED DESCRIPTION OF A SPECIFIC EXAMPLE

Figure 1:
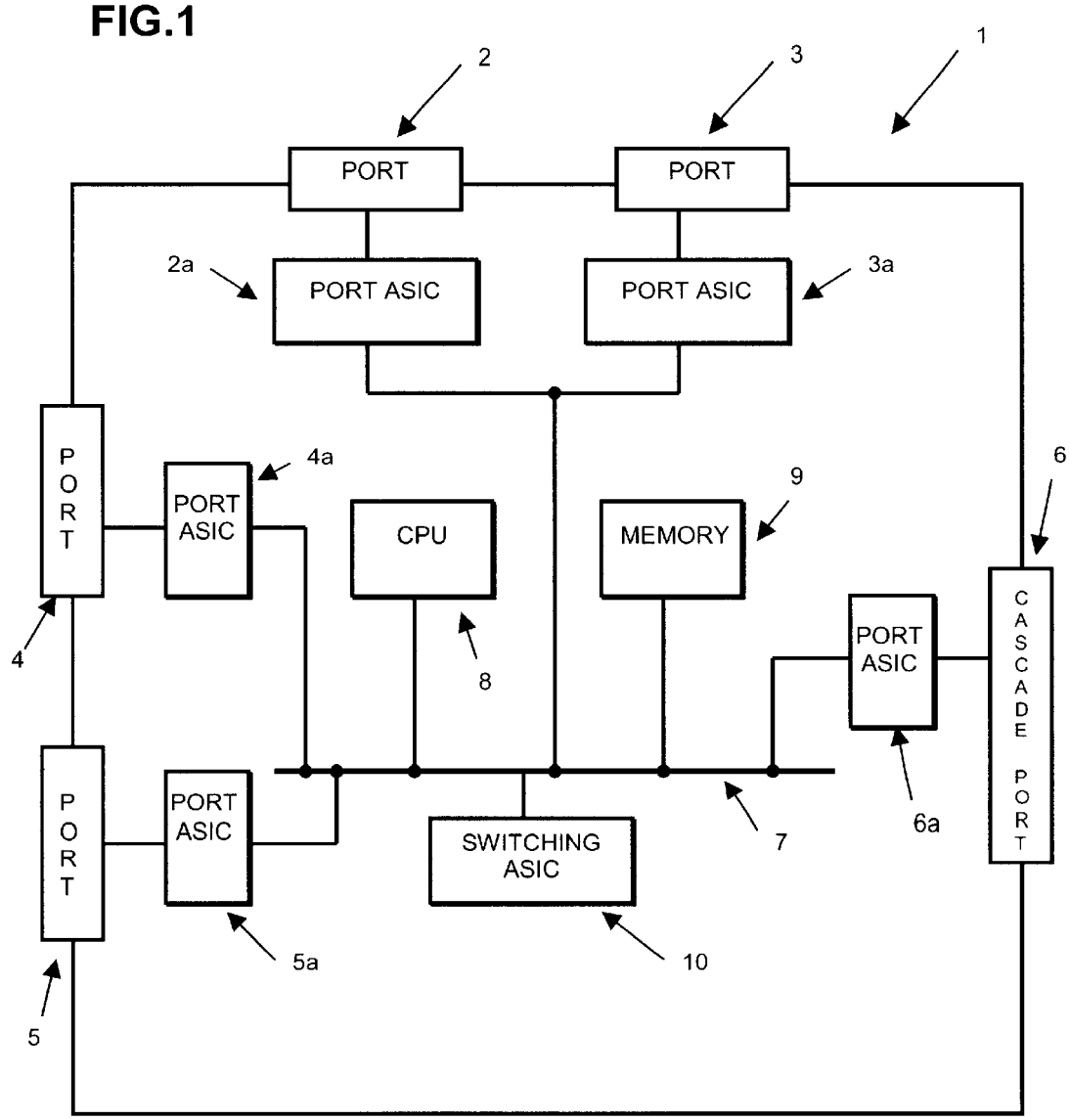
FIG. 1 is a schematic diagram of a multi-port switch which may be used to support the present invention.
Figure 2:
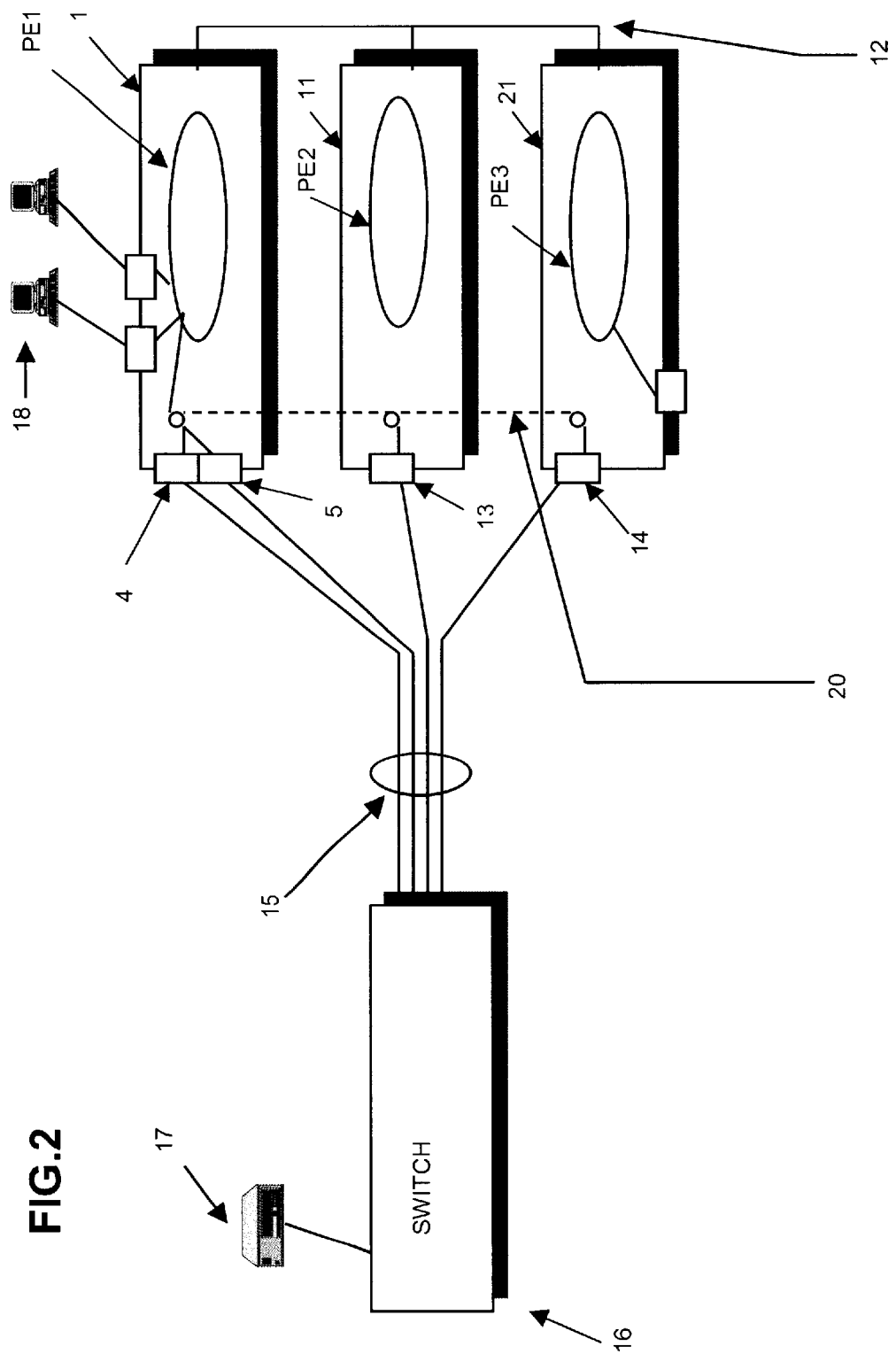
FIG. 2 is a schematic diagram of part of a packet-based communication network including a stack of switch units connected by a distributed trunk to another switch.

FIG. 1 illustrates a typical switch 1 which may be used to support an operating scheme according to the invention. The switch 1 is in generally known form. It includes a multiplicity of ports, of which for convenience five ports, numbers 2, 3, 4, 5 and 6 have been illustrated. As will be apparent from FIG. 2, ports 4 and 5 are two physical ports which form part of a trunked connection to a remote switch. Port 6 is a port which is connected by way of a cascade connection to other switches in a stack of switches organised so that the stack effectively forms a single logical unit having as a multiplicity of ports the aggregate of the ports on the devices 1, 21 and 31 (FIG. 2).

The switch 1 includes a bus 7, which may convey both packets and status information. Coupled to the bus 7 is a processor (CPU) 8, memory 9, and a switching ASIC 10. Each of the ports 2 to 6 has associated with it a respective port ASIC 2a to 6a respectively. These ASICs each comprise a physical layer device (PHY) which, among other things, converts signals from the format in which they are transmitted between unit 1 and other units into a conventional media independent format and a media access controller (MAC) which performs certain basic operations on the header portion of a packet to ensure that the packet is sent to the appropriate physical location.

As previously indicated, the present invention is concerned with the operation of a protocol engine on each of a multiplicity of units such as the unit 1 connected in a stack, as will be explained with reference to FIG. 2. Such a protocol engine is constituted by software stored in memory 9 and executed at appropriate times by the CPU 8. A protocol engine is normally supported by a forwarding engine which may likewise be constituted by software stored within memory 9 and executed by CPU 8 or may be performed by the switching ASIC 10. The main function of the switching ASIC is to determine, with the aid of forwarding database, the destination of a packet which is received at any of the ports of the switch. Forwarding databases are well known and will not be described in detail herein.

As previously indicated, it is known to define a 'logical port' which is allotted a port number but which in combination with appropriate logic or software is interpreted by the network device such that packets directed to such a logical port are automatically directed to one or more physical ports of the device. A logical port may be used to facilitate the forwarding or reception of packets on a trunk constituted by a multiplicity of ports on the same network device. In the present invention a logical port is employed to enable a protocol engine to operate in conjunction with a set of trunk ports which are distributed over a multiplicity of units in a stack of units coupled together by a cascade connection.

FIG. 2 illustrates a stack of switches forming part of a packet-based network, shown in greatly simplified form for the sake of convenience. The stack comprises in addition to switch 1 two other multi-port switches 11 and 21. Each switch has a port, capable of sending and receiving data packets, connected to the other ports by means of a cascade 12. Such a cascade may take a variety of forms; one suitable form is that described in prior copending application Ser. No. 09/207,655 (Brewer et al) filed 9 Dec. 1998. In any event, the switches are configured so that for example a data packet received by or generated by switch 1 but having a destination which is not matched to any of the ports of the switch will be directed to a cascade port so that it can be conveyed to the other switches in the stack.

As indicated above, it is often expedient to employ a trunk connection from a network device to another in order to increase the bandwidth beyond that which could be obtained using a single connection. The present invention relates particularly to circumstances in which a trunk is connected to a multiplicity of ports which are distributed among more than one unit in a stacked cascade. In the Figure, a trunk 15 is coupled to a switch 16 which itself is coupled to a server 17, this being one example where the traffic from the remote device (the switch 16) to the stack composed of switch units 1, 11 and 21 may be very heavy.

In the present case, the trunk has connections to physical ports 4 and 5 of switch 1, port 13 of switch 11 and port 14 of switch 21.

The switch units 1, 21 and 31 may also be connected to users such as users 8 connected to ports 2 and 3 of switch unit 1.

It is known, when two or more ports of a network device such a switch are connected to a trunk, to define a 'logical' port which has a port number as if it were an ordinary physical port but which is connected to the relevant ports in the trunk by, for example, hash logic in the outward direction. From the point of view of the switch or other device having the logical port, packets are sent to or received from the logical port. However, packets directed to the logical port by the internal switching logic are distributed, for example by hashing address data in the packets, so that they are distributed, preferably evenly, to the physical ports to which the logical port is connected. Moreover, packets received by any of the physical ports are connected to the logical port before they are further processed by the switch.

The present invention particularly relates to the running of 'protocol engines' shown at PE1, PE2 and PE3 on the switches 1, 11 and 21 respectively, wherein the protocol engines necessarily must communicate with a remote device which is connected to the stack of units by a trunked connection composed of ports distributed among at least some of the units instead of ports of a single unit.

It is necessary for the proper working of such protocol engines, such as those performing the protocols known as spanning tree, IGMP snooping, GVRP or GMRP, that all the data that such a protocol engine requires is available locally, that is to say within the switch or network device that supports the protocol engine.

In a system as shown in FIG. 2 however at least some of the data that for example the protocol engine PE1 requires will be supplied via the switch 16 and trunk 15 to ports 13 and 14 on switch units 11 and 21. The present invention provides a means to enable all the information received by way of the trunk 15 to be available locally to any given protocol engine, such as the protocol engine PE1 running on unit 1 in FIG. 2. The data is forwarded across the cascade 12 and, when it arrives at unit 2 is made to appear as if the data arrived directly from the trunk. This process of forwarding protocol packets makes it appear as if there were a single logical trunk port 20 that spanned the entire stack and was connected to the protocol engine PE1 on unit 1 but not to the protocol engines on the other units in the stack. Data that arrives on ports (such as 4 and 5) that are on the same unit as the unit 1 that is hosting the protocol engine PE1 are passed directly to the protocol engine PE1.

Figure 3:
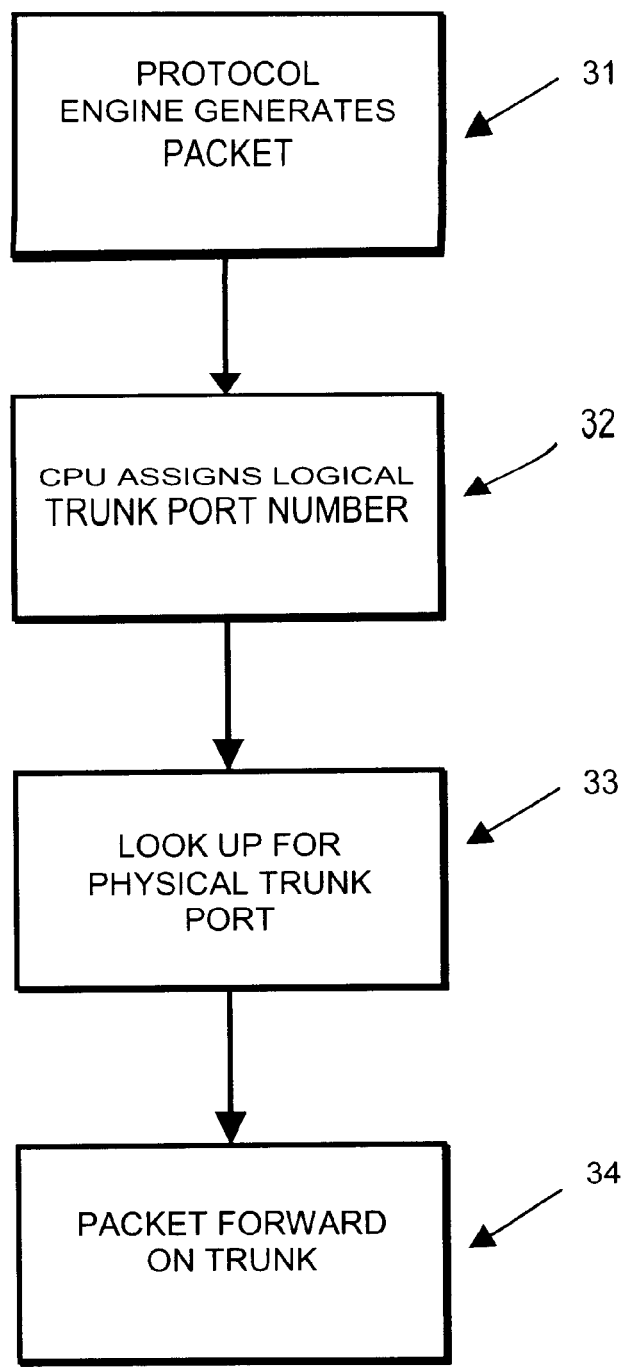
FIG. 3 is a flow diagram illustrating the stages in the forwarding of a packet produced by a protocol engine.

FIG. 3 illustrates the process by which a packet is forwarded from the protocol engine over the trunk 15 to the switch 17 and on to a destination such as the unit 17. The protocol engine generates a packet, shown in stage 31. A logical trunk port number is assigned to the packet by means of the forwarding engine within the CPU, as shown in stage 32. There is a look-up using the logical port number for the physical trunk port on which the packet should be forwarded. This is shown in stage 33. Finally, the packet is forwarded on the trunk, stage 34.

Figure 4:
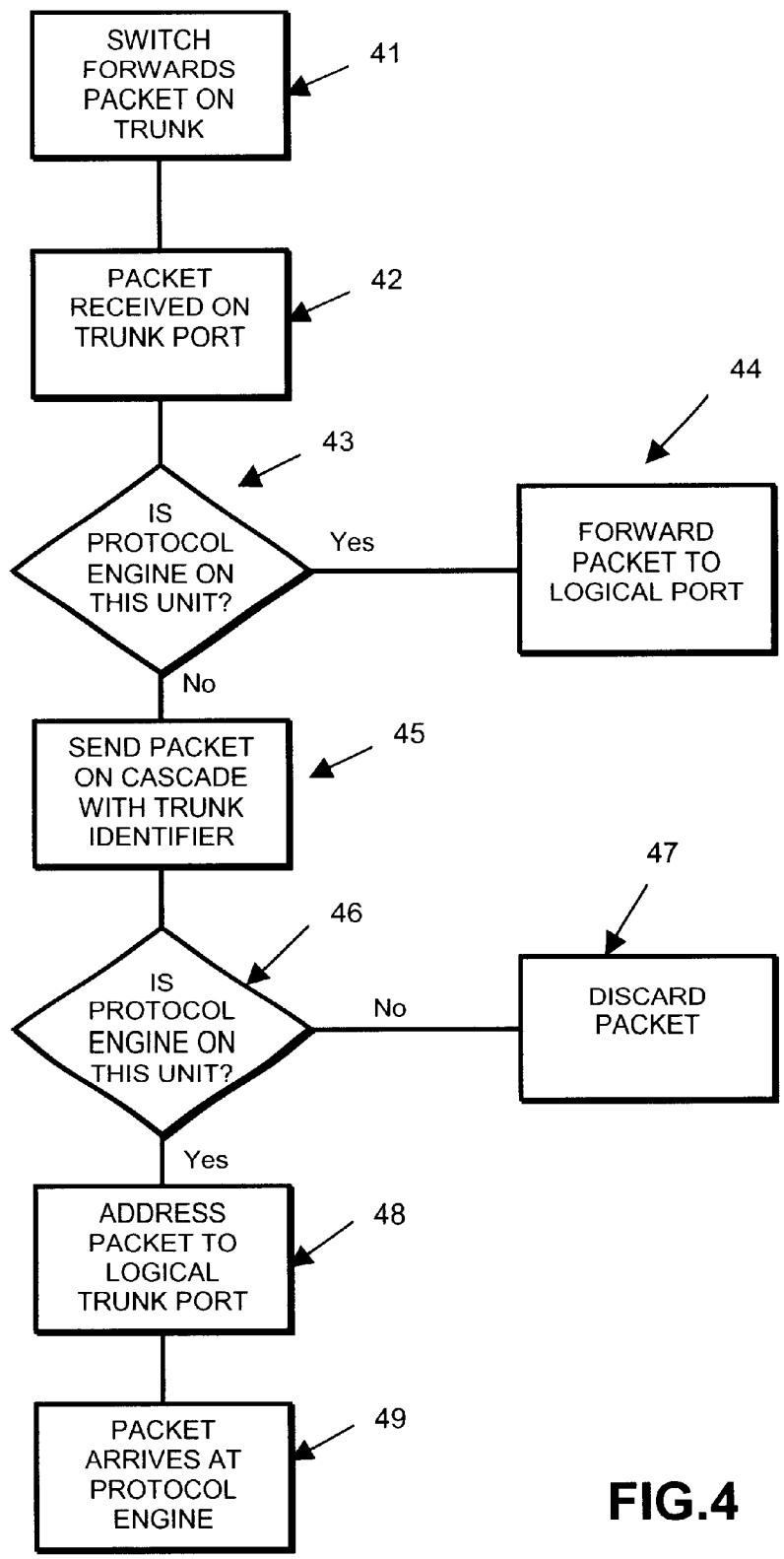
FIG. 4 is a flow diagram illustrating the manner in which a packet reaches a protocol engine according to the invention.

More specifically relevant to the present invention is the process by which a packet which traverses switch 16 and is intended for a specific protocol engine, such as engine PE1, traverses the stack to reach the destination. FIG. 4 illustrates the various stages whereas FIG. 5 shows the paths taken by packets intended for the protocol engine PE1.

Figure 5:
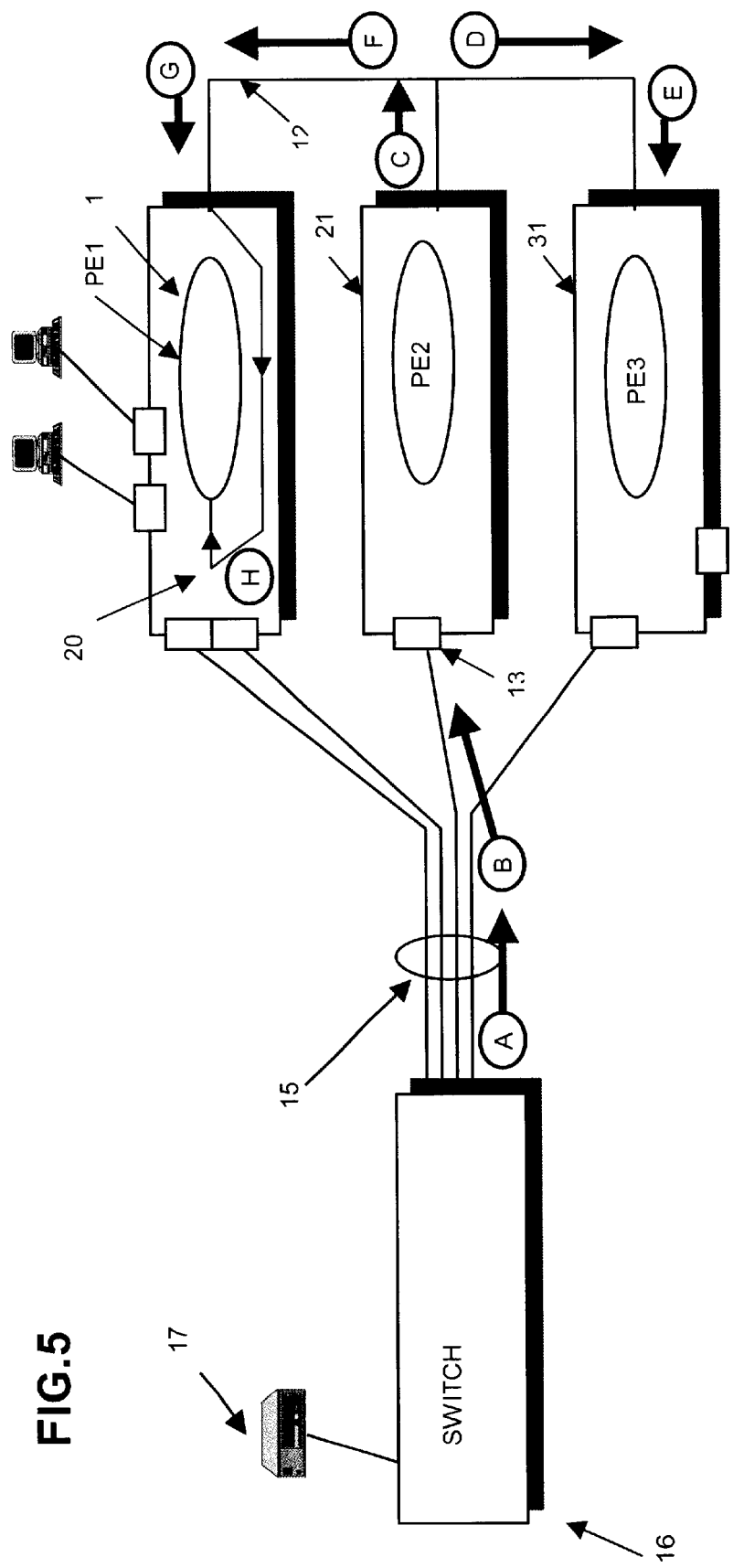
FIG. 5 is a diagram illustrating a path for a packet to a protocol engine in accordance with the invention.

FIG. 5 is specific to the case where the packet from switch 16 is sent to the unit 21 which does not host the relevant protocol engine PE1, this protocol engine being hosted by unit 1.

The return process begins with stage 41 in FIG. 4, at which the switch 16 forwards the packet on the trunk 15. This is shown by the arrow A in FIG. 5, the packet being sent by the switch 16 across the trunk 15. The packet travels along path B to a physical port on one of the units in the stack. It is inherent in the use of trunks that the switch 16 cannot determine which of the destination ports (4, 5, 13 and 14) should be the recipient of a packet sent by switch 16 on the trunk 15. As will be appreciated, if the packet happens to be dispatched so that it reaches either port 4 or port 5, it is then received by the unit that is hosting the protocol. The present invention is intended to cope with the distribution of the trunk ports over more than one stacked unit, so that the packets sent by switch 16 and intended for protocol engine 1 might be received at port 13 on unit 21 or port 14 on unit 31.

When a packet is received on a trunk port of any of the units, the relevant port ASIC makes the determination whether the packet identifies a protocol engine which is hosted on that particular unit (stage 43). This may be done, in accordance with known practice, by examination of the packet type, a destination MAC address and other data in the packet. If stage 43 is performed on a packet received by either port 4 or port 5 on unit 1, the determination is affirmative and the packet can therefore be forwarded to the logical trunk port (20) which is defined for the protocol engine. This is shown by stage 44.

If however the packet is received on a port, such as port 13, on a unit, such as unit 21, not hosting the relevant protocol engine (PE1), it will be sent over the cascade 12 along with a trunk identifier. The packets may be forwarded to all units in the stack or to the specific unit hosting a protocol engine. If the packet is sent to all the other units in the stack then a copy of the packet may follow paths D and E to the unit 31 which does not have the protocol engine PE1. The unit 1 will identify the packet as being a protocol packet, according to the destination MAC address, the packet type and the contents of the packet, but will determine that the packet arrived on a cascade port. Because the protocol packet came in on a cascade port and the receiving unit is not hosting the protocol engine (PE1) for the trunk the packet is discarded. These stages are stages 46 and 47 in FIG. 4.

However, the packet or a copy thereof will follow paths F and G in FIG. 5 to the unit 1 that is hosting the protocol engine PE1.

The version of the packet that passes over the cascade will have the same format as the packet that was received at port 13 of unit 21 but will be encapsulated within any cascade formatting. As described in the aforementioned application Ser. No. 09/207,655 (Brewer et al) the cascade formatting normally includes two bits, identified in the aforementioned application as 'trunk 0' and 'trunk 1' which identifies the trunk, in the case the trunk 15, to which the packet belongs.

Accordingly, when a packet arrives at the unit 1 the packet is examined by the ASIC of the cascade port to see if the packet originally entered the stack of units 1, 21 and 31, on a port that is a member of a trunk. This may readily be done by examination of the trunk field above mentioned. If the packet did come from the physical trunk port the packet is tagged (stage 48) with the number of the logical trunk port (20) and is directed (stage 49) to the protocol engine, as shown by path H.

Packets that have not come by way of the trunk yet arrive on the cascade port 6 will after an examination of the trunk fields in the encapsulation of the packet be tagged as coming from the logical port associated with the cascade. This provides distinction between packets which may or may not be intended for the protocol engine but did not come by way of the trunk 15 from those packets which are intended for the protocol engine and have been received by way of the trunk 15.

What is claimed is:

1. A method of operating a plurality of multi-port network devices of which at least one supports a protocol engine which generates and responds to addressed data packets, said network devices being connected in a logical stack by means of a cascade connection, the method comprising:

(a) constituting a trunk connection including a multiplicity of physical ports distributed among said one device and a least a second of said devices;

(b) defining in said one device a logical trunk port for the forwarding and reception of packets for said protocol engine;

(c) receiving packets intended for said protocol engine at said physical ports;

(d) directing a packet intended for said protocol engine and received at a physical trunk port of said second device to said one device by way of said cascade connection;

(e) providing said packet with an indication that said packet was received by way of said trunk connection; and (f) interpreting said indication to signify that said packet has been received at said logical trunk port.

2. A method according to claim 1 further comprising:

receiving by way of said cascade connection at a third of said devices a replica of said packet;

determining that said packet is not intended for a protocol engine supported by said third of said devices; and thereupon discarding said replica.

\* \* \* \* \*